(12) United States Patent
Uozu et al.

(10) Patent No.: US 9,174,562 B2
(45) Date of Patent: Nov. 3, 2015

(54) TRANSPORT VEHICLE

(71) Applicant: HITACHI CONSTRUCTION MACHINERY CO., LTD., Tokyo (JP)

(72) Inventors: Hironori Uozu, Kasumigaura (JP); Yohei Nakate, Tsuchiura (JP); Takashi Yagyu, Ushiku (JP)

(73) Assignee: HITACHI CONSTRUCTION MACHINERY, CO., LTD., Tokyo (JP)

( * ) Notice: Subject to any disclaimer, the term of this patent is extended or adjusted under 35 U.S.C. 154(b) by 0 days.

(21) Appl. No.: 14/370,281

(22) PCT Filed: Mar. 6, 2013

(86) PCT No.: PCT/JP2013/056118
§ 371 (c)(1),
(2) Date: Jul. 2, 2014

(87) PCT Pub. No.: WO2013/146140
PCT Pub. Date: Oct. 3, 2013

(65) Prior Publication Data
US 2015/0015054 A1 Jan. 15, 2015

(30) Foreign Application Priority Data
Mar. 26, 2012 (JP) ................................. 2012-069232

(51) Int. Cl.
*B60P 1/16* (2006.01)
*F15B 11/024* (2006.01)
*B60P 1/28* (2006.01)

(52) U.S. Cl.
CPC . *B60P 1/162* (2013.01); *B60P 1/16* (2013.01); *B60P 1/283* (2013.01); *F15B 11/024* (2013.01); *F15B 2211/20546* (2013.01); *F15B 2211/3058* (2013.01); *F15B 2211/30565* (2013.01); *F15B 2211/3127* (2013.01); *F15B 2211/327* (2013.01); *F15B 2211/45* (2013.01); *F15B 2211/6346* (2013.01); *F15B 2211/7057* (2013.01)

(58) Field of Classification Search
CPC ............ B60P 1/283; B60P 1/16; B60P 1/162; F15B 11/024; F15B 2211/20546; F15B 2211/45; F15B 2211/6346; F15B 2211/7057; F15B 2211/327; F15B 2211/30565; F15B 2211/3058; F15B 2211/3127
USPC ..... 298/22 R, 22 P, 22 C; 91/358 R, 444, 436
See application file for complete search history.

(56) References Cited

U.S. PATENT DOCUMENTS

2002/0047300 A1* 4/2002 Uematsu et al. ............ 298/22 R
2010/0026079 A1 2/2010 Nabeshima et al.

FOREIGN PATENT DOCUMENTS

JP 2004-138170 A 5/2004
WO 2008/099691 A1 8/2008

*Primary Examiner* — Stephen Gordon
(74) *Attorney, Agent, or Firm* — Mattingly & Malur, PC

(57) ABSTRACT

A control valve device (19) controls supply and discharge of pressurized oil to and from a hoist cylinder (12) which tilts a vessel (3). A throttle (24C) that limits a flow rate of hydraulic oil which is discharged from a hydraulic pump (13) and flows in a return line (16) through a pump line (15), a first directional control valve (24) and a center bypass oil passage (23) is provided in the floating position (F) of the first directional control valve (24). When the first directional control valve (24) is in the floating position (F), the upstream side of the throttle (24C) is connected to the pump line (15), and the downstream side of the throttle (24C) is connected to the return line (16). In addition, a rod-side actuator line (18) communicated with rod-side oil chambers (12E, 12F) in the hoist cylinder (12) is connected to the pump line (15).

4 Claims, 5 Drawing Sheets

TRANSPORT VEHICLE

TECHNICAL FIELD

The present invention relates to a transport vehicle such as a dump truck which is suitably used in transporting, for example, crushed stones or earth and sand excavated in an open-pit digging site, a stone quarry or a mine.

BACKGROUND ART

In general, a large-sized transport vehicle called a dump truck is provided with a vessel (loading platform) on a frame of a vehicle body tiltably in an upper-lower direction on a basis of the rear side. The transport vehicle carries and transports objects (for example, crushed stones or earth and sand) to be transported to a transportation destination (cargo unloading site or cargo collection site) in a state where the objects to be transported are loaded in a large amount on the vessel (Patent Document 1).

A transport vehicle of this type according to the conventional art comprises schematically an automotive vehicle body, a vessel which is provided on the vehicle body tiltably (liftably) in an upper-lower direction on a basis of the rear side and on which the objects to be transported are loaded, a hoist cylinder which is provided between the vessel and the vehicle body and tilts the vessel upward or downward with expansion or contraction of a rod therein, a hydraulic source comprising a hydraulic oil tank for reserving hydraulic oil and a hydraulic pump for delivering pressurized oil as the hydraulic oil to supply the pressurized oil to a bottom-side oil chamber or a rod-side oil chamber in the hoist cylinder for expanding or contracting the hoist cylinder, and a control valve device provided between the hydraulic source and the hoist cylinder to control supply and discharge of the pressurized oil to and from the bottom-side oil chamber or rod-side oil chamber in the hoist cylinder.

The control valve device used in the transport vehicle has a total of four switching positions composed of a raising position of supplying the pressurized oil from the hydraulic pump to the bottom-side oil chamber and discharging the hydraulic oil in the rod-side oil chamber to the hydraulic oil tank to expand the hoist cylinder for upward tilt (rotation) of the vessel, a lowering position of supplying the pressurized oil to the rod-side oil chamber and discharging the hydraulic oil in the bottom-side oil chamber to contract the hoist cylinder and lower down (downward rotate) the vessel, a floating position of discharging the hydraulic oil in the bottom-side oil chamber by self-weight of the side of the vessel to contract the hoist cylinder and allow for self-weight fall of the vessel, and a neutral position of stopping supply and discharge of the pressurized oil to and the from the hoist cylinder to stop movement of the hoist cylinder for holding the vessel.

Here, the control valve device is selectively switched to any switching position of the total of the four switching positions in response to a manual operation of an operating lever which an operator operates. The transport vehicle self-travels to the transportation destination in a state of loading the objects in the vessel and thereafter, expands the hoist cylinder to diagonally backward rotate the vessel. This raising operation allows the objects to be dumped to a cargo unloading site along the tilting direction of the vessel.

That is, when the operation of the operating lever by the operator switches the control valve device from the neutral position to the raising position, the pressurized oil from the hydraulic pump is supplied toward the bottom-side oil chamber in the hoist cylinder and the hydraulic oil in the rod-side oil chamber therein is discharged to the hydraulic oil tank. In consequence, the hoist cylinder expands to rotate the vessel in such a manner as to be greatly tilted to the vehicle body backward side, thus discharging (dumping) the loads in the vessel outside thereof in a sliding/falling manner.

On the other hand, after the dumping operation of the objects is completed, when the control valve device is switched from the raising position to, for example, the floating position by the operation of the operating lever, the hydraulic oil in the bottom-side oil chamber of the hoist cylinder is discharged by the self-weight of the side of the vessel to contract the hoist cylinder. Therefore, the vessel gradually goes down by the self-weight to a position of being seated on the vehicle body.

At traveling of the vehicle, for example, the operating lever is held to the floating position. Thereby, the vessel continues to be seated on the vehicle body by the self-weight, and the hoist cylinder also can be held in the contraction state by using the self-weight of the side of the vessel.

Incidentally, vehicle traveling paths of a crushed stone site or the like in a mine are dirt roads, and mostly have ragged road surfaces. In a transport vehicle traveling on such a road, vibrations caused by the bumpy road surface at traveling become larger in magnitude. At this time, in a case where the vessel is empty in loading, the vessel floats up from the vehicle body following vibrations caused by knocking-up from the road surface, and thereafter, the vessel collides with the vehicle body at the time when the vessel is again seated on the vehicle body. Therefore, uncomfortable feelings are given to the operator in the cab or repeated collisions of the vessel with the vehicle body degrade the durability and lifetime.

Therefore, in the transport vehicle according to Patent Document 1, in a case where the vehicle body is in the traveling state and the control valve device is in the floating position, when it is detected that the vessel moves in a direction of floating from the vehicle body, the control valve device is controlled from the floating position to the lowering position by a control unit. Thereby, when the vessel tends to float from the vehicle body, the control valve device is switched from the floating position to the lowering position, and thereby, the vessel can be pressed to the vehicle body side to restrict the floating-up of the vessel.

PRIOR ART DOCUMENT

Patent Document

Patent Document 1: WO 2008/099691 A1

SUMMARY OF THE INVENTION

In the transport vehicle according to the aforementioned Patent Document 1, for needing a sensor which detects that the vessel moves in the floating direction, there is a possibility of cost increase corresponding to a provision of the sensor. On the other hand, for example, depending on the bumpy degree of the road surface or the traveling speed, there are some cases where a floating height of the vessel is low and a floating time thereof is very short. In this case, when the floating of the vessel is detected, there is a possibility that the vessel falls from a point where the control valve device is switched from that detection position to the lowering position to a point of pressing the vessel to the side of the vehicle body, and then, collides with the vehicle body.

In view of the aforementioned problems in the conventional art, it is an object of the present invention to provide a transport vehicle which can stably seat a vessel on a vehicle body at the time of traveling in a state where a control valve device is in a floating position.

(1) In order to solve the above-described problems, the present invention is applied to a transport vehicle comprising an automotive vehicle body; a vessel which is tiltably provided on the vehicle body in an upper-lower direction on a basis of the rear side and on which objects to be transported are loaded; a hoist cylinder which is provided between the vessel and the vehicle body and tilts the vessel upward or downward with expansion or contraction of a rod; a hydraulic source comprising a hydraulic oil tank for reserving hydraulic oil therein and a hydraulic pump for delivering hydraulic oil as the pressurized oil; a control valve device for controlling supply and discharge of the pressurized oil to and from the hoist cylinder; a pump line for establishing connection between the hydraulic pump and the control valve device; actuator lines for establishing connection between the control valve device and the hoist cylinder; and a return line for returning the hydraulic oil which is delivered from the hydraulic pump and passes through the control valve device back to the hydraulic oil tank, wherein the control valve device has a plurality of switching positions composed of a raising position of expanding the hoist cylinder with supply and discharge of the pressurized oil to tilt the vessel upward, a lowering position of contracting the hoist cylinder with supply and discharge of the pressurized oil to lower down the vessel, a floating position of contracting the hoist cylinder with a self-weight of the side of the vessel to allow for self-weight fall of the vessel, and a neutral position of stopping movement of the hoist cylinder by stopping supply and discharge of the pressurized oil to hold the vessel.

The configuration adopted by the present invention is characterized in that a flow rate limiting section is provided in the floating position of the control valve device to limit a flow rate of the hydraulic oil flowing in the return line from the hydraulic pump, wherein when the control valve device is in the floating position, then upstream side of the flow rate limiting section is connected to the pump line, the downstream side of the flow rate limiting section is connected to the return line, and a rod-side actuator line communicated with rod-side oil chambers in the hoist cylinder among the actuator lines is connected to the pump line.

With this arrangement, when the control valve device is in the floating position, the hydraulic oil which is delivered from the hydraulic pump and flows in the return line through the pump line and the control valve device is limited in the flow rate by the flow rate limiting section. Therefore, a pressure (back pressure) corresponding to the flow rate of the hydraulic oil flowing in the flow rate limiting section and the degree of the flow rate limit is kept in the pump line upstream of the flow rate limiting section. In this case, since the rod-side actuator line is connected to the pump line, the rod-side oil chambers in the hoist cylinder are pressurized by the pressure kept by the flow rate limiting section.

Thereby, a thrust force (contraction force) in a direction of contracting the rod is generated in the hoist cylinder, and the vessel can be pressed against the vehicle body by the hoist cylinder. As a result, when the vehicle travels in a state where the control valve device is in the floating position, even if the force of a direction of floating the vessel from the vehicle body is applied to the vessel following passage of the vehicle on the bumpy road surface, the floating of the vessel can be restricted by the thrust force of the hoist cylinder. In this case, since the thrust force of the hoist cylinder can be regularly generated by the flow rate limiting section, it is possible to stably seat the vessel on the vehicle body. In addition, since the sensor which detects the movement of the vessel is not necessary, it is possible to restrict the cost increase.

(2) According to the present invention, the flow rate limiting section is configured of a throttle which reduces a flow passage area. With this arrangement, since the flow rate limiting section is configured of the throttle, a desired pressure (back pressure) can be kept upstream of this throttle by setting the flow passage area of this throttle to an appropriate magnitude. That is, a thrust force (contraction force) necessary for restricting the floating of the vessel can be generated in the hoist cylinder while restricting a load of the hydraulic pump.

(3) According to the present invention, the control valve device comprises first and second directional control valves connected in parallel between the hydraulic source and the hoist cylinder, wherein the first directional control valve is switched to any position of the neutral position, the raising position and the floating position, and the second directional control valve is switched to any position of the neutral position, the raising position and the lowering position.

With this arrangement, when the first directional control valve is in the floating position, the vessel can be pressed against the vehicle body by the hoist cylinder. Thereby, the vessel can be stably seated onto the vehicle body regardless of passage of the vehicle on the bumpy road surface.

(4) According to the present invention, an actuator connecting oil passage which connects the outflow side of the control valve device to the actuator line and the return line or the hydraulic oil tank is provided, and a check valve is provided midway of the actuator connecting oil passage to allow flow of the hydraulic oil only to the side of the hoist cylinder from the return line or the hydraulic oil tank. With this arrangement, the hydraulic oil resupplied through the check valve from the return line or the hydraulic oil tank can prevent the oil chamber in the hoist cylinder from becoming a vacuum pressure.

MODE FOR CARRYING OUT THE INVENTION

Figure 1:
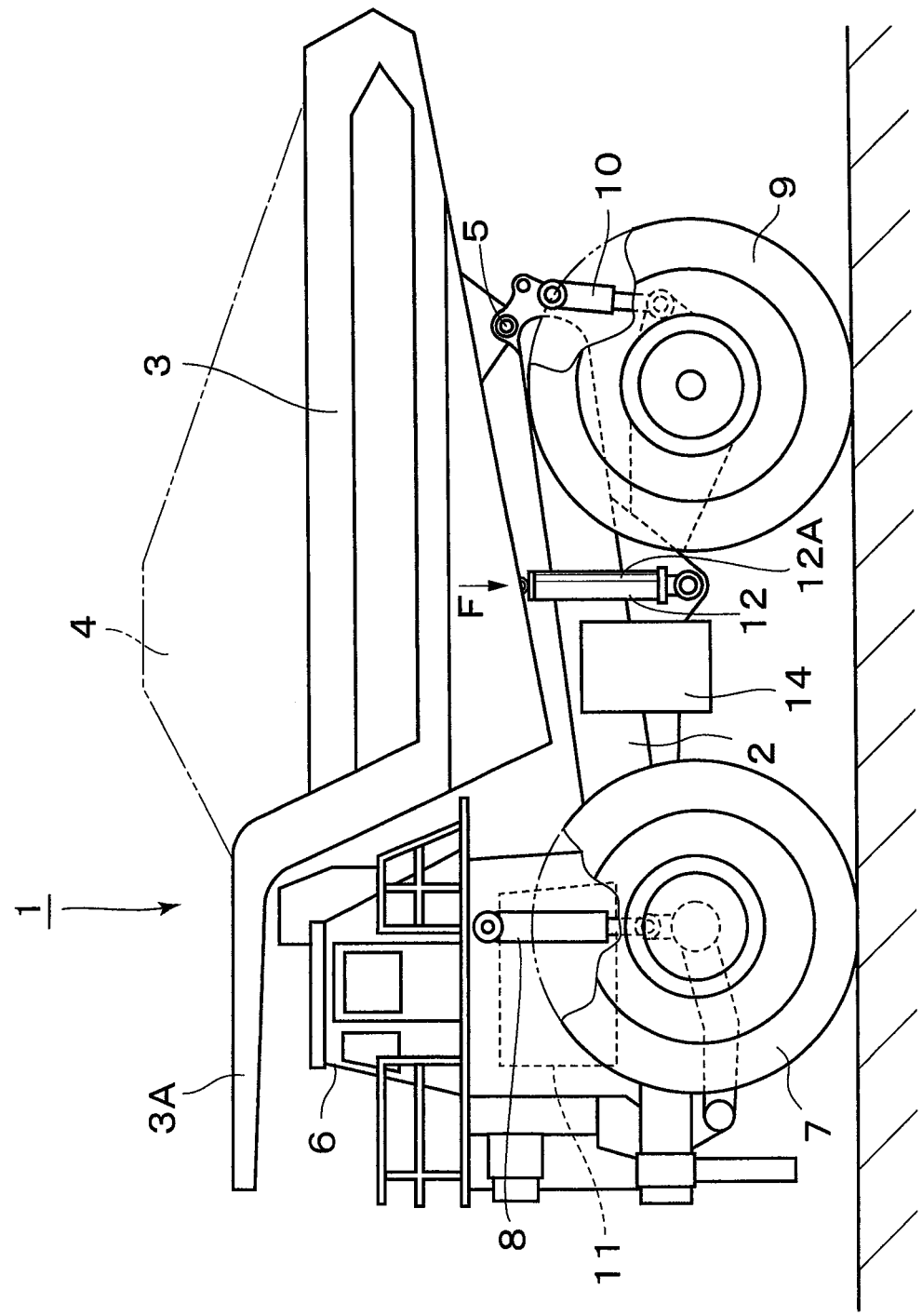
FIG. 1 is a front view showing a dump truck according to an embodiment of the present invention.

Hereinafter, a transport vehicle according to an embodiment of the present invention will be in detail explained with reference to the accompanying drawings by taking a dump truck for transporting crushed stones, and earth and sand excavated in a mine, as an example.

In the figure, designated at 1 is a dump truck which is a large-sized transport vehicle, and the dump truck 1 schematically comprises a vehicle body 2 having a rigid frame structure, a vessel 3 (loading platform) mounted on the vehicle body 2 tiltably (liftably) on a basis of the rear side, and front wheels 7 and rear wheels 9 to be described later by which the vehicle body 2 travels.

The vessel 3 is formed as a large-sized container whose overall length reaches as much as 10 to 13 meters to load a large volume of heavy objects to be transported, such as crushed stones, and earth and sand (hereinafter, called earth and sand 4). A rear side bottom portion of the vessel 3 is tiltably coupled to the rear end side of the vehicle body 2 by using a connecting pin 5. In addition, a protector 3A is integrally provided on a front side top portion of the vessel 3 in such a manner as to cover a cab 6 to be described later from the upper side.

That is, the bottom side of the vessel 3 is rotatably supported by the rear side of the vehicle body 2 by using the connecting pin 5. When a hoist cylinder 12 to be described later is expanded or contracted, the front side (side of the protector 3A) of the vessel 3 is raised or lowered (tilted) vertically on a basis of a position of the connecting pin 5. In consequence, the vessel 3 is rotated between a traveling position shown in FIG. 1 and a dumping position shown in FIG. 2. For example, at the dumping position shown in FIG. 2, a large number of the earth and sand 4 loaded in the vessel 3 is dumped at a predetermined unloading site so as to slide down in an arrow Y direction from the vessel 3 which has tilted backward.

Indicated at 6 is the cab which is provided in the front portion of the vehicle body 2 to be located under the lower side of the protector 3A. The cab 6 defines an operator's room where an operator of the dump truck 1 gets in/off. An operator's seat, an accelerator pedal, a brake pedal and a steering handle (any thereof is not shown), an operating lever 38A to be described later (refer to FIG. 3 and FIG. 4), and the like are provided inside the cab 6.

The protector 3A of the vessel 3 protects the cab 6 from flying stones such as rocks by substantially completely covering the cab 6 therewith from the upper side. The protector 3A of the vessel 3 has a function of protecting the operator inside the cab 6 at the time the vehicle (dump truck 1) falls down.

Right and left front wheels 7 (only one is shown) are provided rotatably on the front side in the vehicle body 2, and the front wheels 7 are configured as steered wheels which are steered by the operator of the dump truck 1. Further, each of the front wheels 7 is formed with a tire diameter (outer diameter dimension) of, for example, as much as 2 to 4 meters in the same way as each of rear wheels 9 to be described later. A front suspension 8 composed of hydraulic shock absorbers and the like is provided between the front portion of the vehicle body 2 and the front wheels 7. The front suspension 8 suspends the front side of the vehicle body 2 between the front wheels 7.

Right and left rear wheels 9 (only one is shown) are rotatably provided on the rear side in the vehicle body 2, and the rear wheels 9 are configured as drive wheels of the dump truck 1 which are driven and rotated by a traveling drive unit (not shown). A rear suspension 10 composed of hydraulic shock absorbers and the like is provided between the rear portion of the vehicle body 2 and the rear wheels 9. This rear suspension 10 supports the rear side of the vehicle body 2 between the rear wheels 9.

An engine 11 as a prime mover is configured, for example, by a large-sized diesel engine or the like. The engine 11 is provided in the vehicle body 2 to be located under the cab 6, and drives/rotates a hydraulic pump 13 (refer to FIG. 3 to FIG. 5) to be described later and the like.

Figure 3:
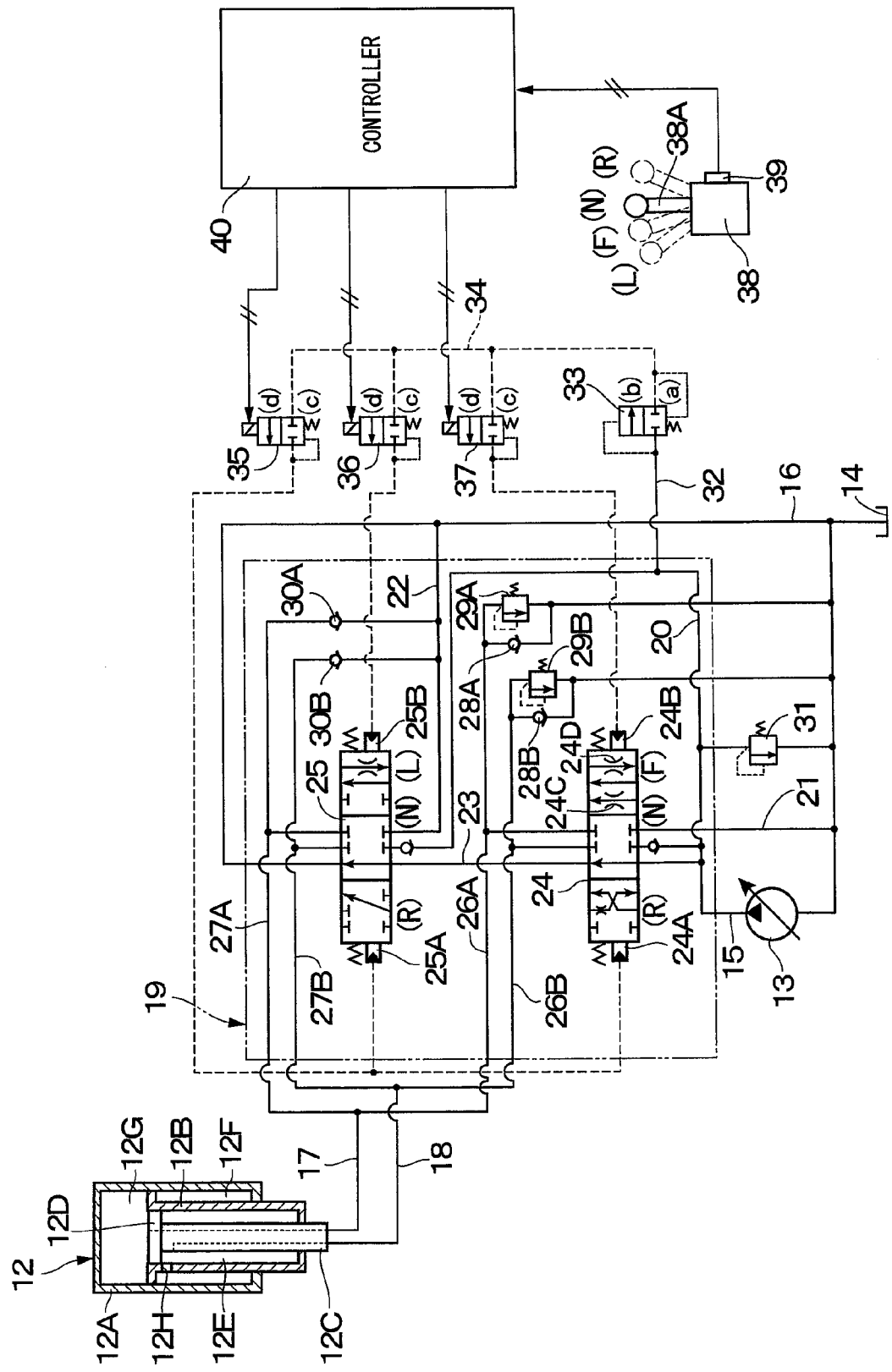
FIG. 3 is a hydraulic circuit diagram for controlling/driving a hoist cylinder.
Figure 4:
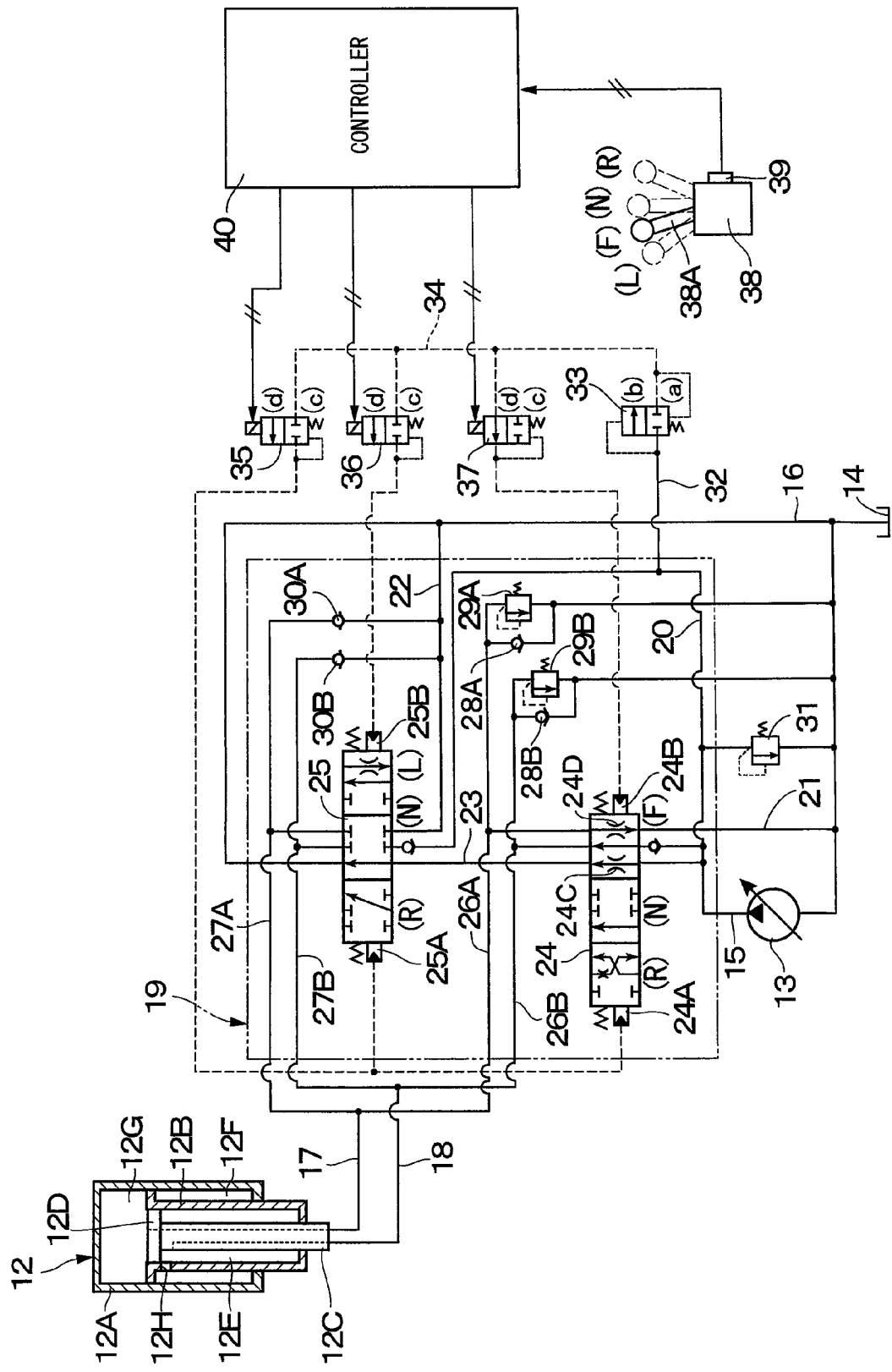
FIG. 4 is a hydraulic circuit diagram showing a state where a control valve device is in a floating position.
Figure 5:
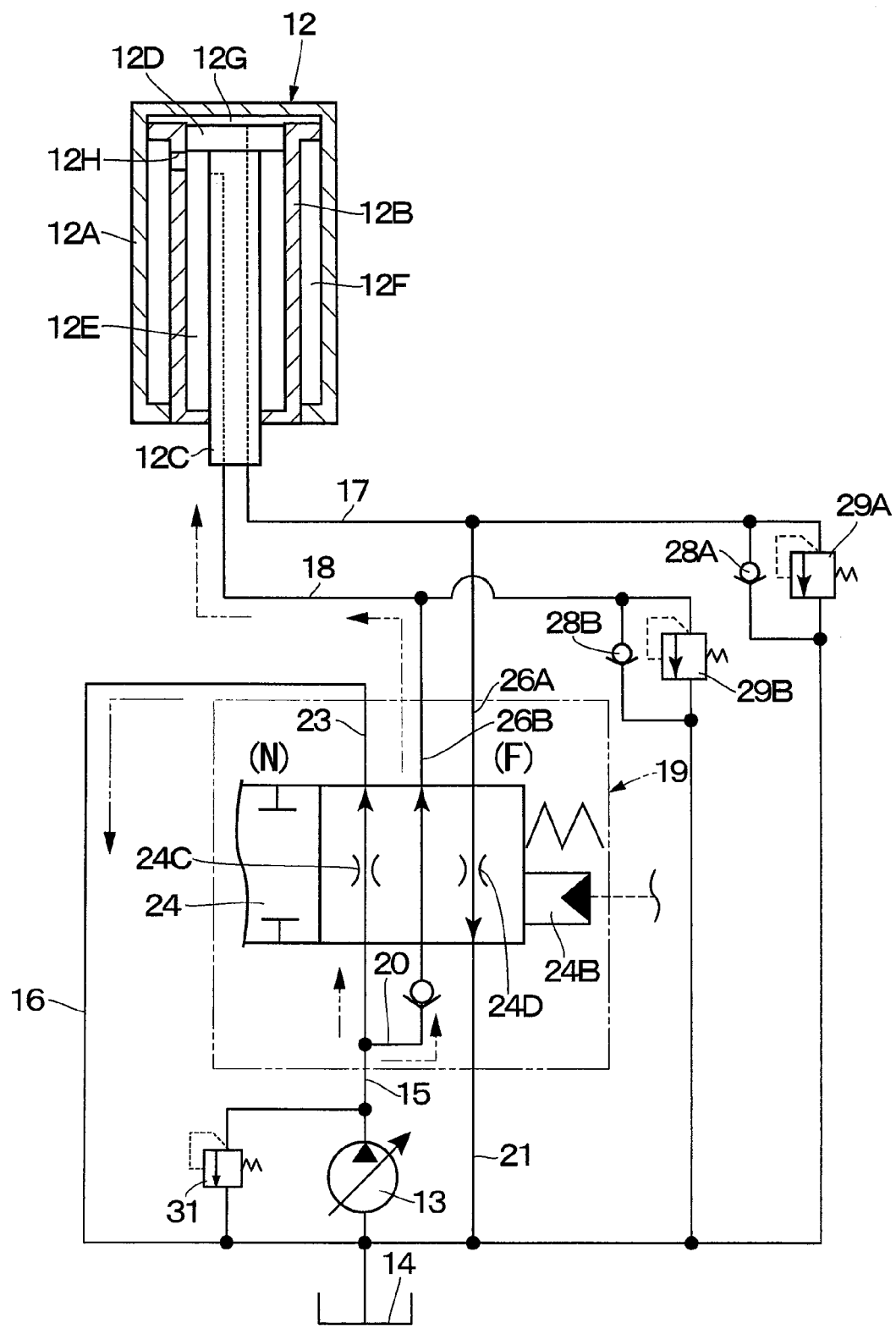
FIG. 5 is a hydraulic circuit diagram shown by schematically enlarging a state where the control valve device is in the floating position.

Designated at 12 are a pair of right and left hoist cylinders (only one thereof is shown) telescopically provided between the vehicle body 2 and the vessel 3. As shown in FIG. 3 to FIG. 5, this hoist cylinder 12 is formed of a multi-stage (for example, two-stage) hydraulic cylinder, a so-called telescopic hydraulic cylinder 5. That is, the hoist cylinder 12 is configured by a cylindrical outer tube portion 12A positioned at the outer side, a cylindrical inner tube portion 12B one end of which is telescopically inserted in the outer tube portion 12A and the other end of which projects outside of the outer tube portion 12A, a rod 12C one end of which is telescopically inserted in the inner tube portion 12B and the other end of which projects outside of the inner tube portion 12B, and a piston 12D which is provided in one end side of the rod 12C and slides in the inner tube portion 12B.

The inside of the outer tube portion 12A of the hoist cylinder 12 are divided into three chambers composed of rod-side oil chambers 12E and 12F, and a bottom-side oil chamber 12G defined by the inner tube portion 12B, the rod 12C and the piston 12D. In this case, the rod-side oil chamber 12F is communicated with the rod-side oil chamber 12E through a port 12H provided in the inner tube portion 12B. The hoist cylinder 12 tilts the vessel 3 upward or downward on a basis of the rear side by expansion or contraction of the inner tube portion 12B and the rod 12C.

Specifically, the hoist cylinder 12 is configured such that, when pressurized oil is supplied into the bottom-side oil chamber 12G from the hydraulic pump 13, the inner tube portion 12B expands together with the rod 12C downward, and when the inner tube portion 12B expands at the maximum, only the rod 12C further expands to the maximum expansion position downward. Thereby, the hoist cylinder 12 rotates the vessel 3 to a raising position (dumping position) of being diagonally backward tilted on a basis of the connecting pin 5.

On the other hand, the hoist cylinder 12 is configured such that, when the pressurized oil is supplied inside the rod-side oil chamber 12E from the hydraulic pump 13 in a state where the rod 12C expands at the maximum, only the rod 12C first contracts, and thereafter, the inner tube portion 12B contracts to the maximum contraction position together with the rod 12C. Therefore, the hoist cylinder 12 rotates the vessel 3 to the lowering position (traveling position) of being downward lowered on a basis of the connecting pin 5.

Next, the hydraulic circuit for driving the hoist cylinder 12 will be explained with reference to FIG. 3 to FIG. 5.

Figure 2:
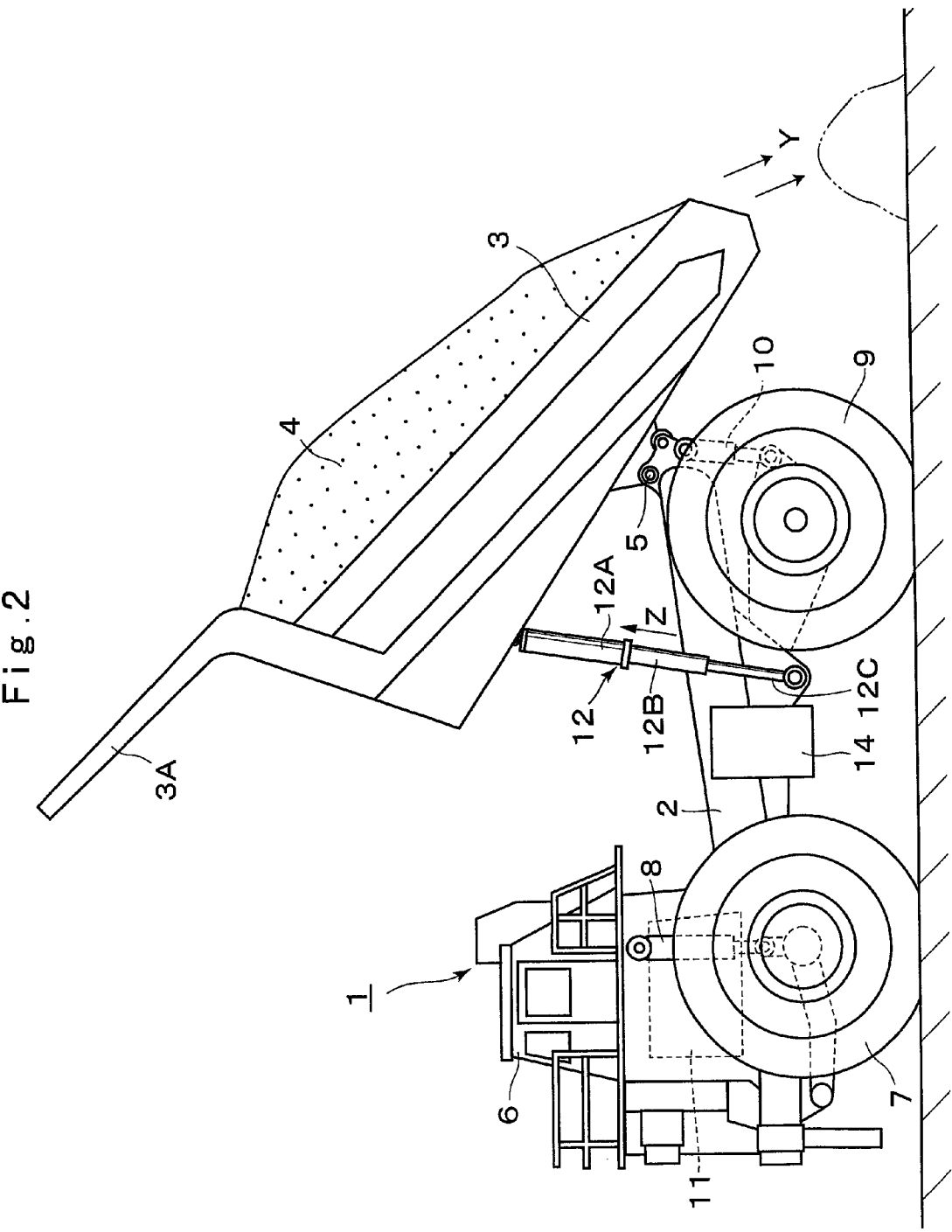
FIG. 2 is a front view showing a state of diagonally backward tilting a vessel of the dump truck to dump objects therefrom.

Indicated at 13 is the hydraulic pump which delivers the hydraulic oil as pressurized oil. The hydraulic pump 13 configures a hydraulic source together with a hydraulic oil tank 14 for reserving the hydraulic oil therein to supply and discharge the pressurized oil to and from the hoist cylinder 12. As shown in FIG. 1 and FIG. 2, the hydraulic oil tank 14 is mounted on the side surface of the vehicle body 2 to be located under the vessel 3.

Here, the hydraulic oil accommodated inside the hydraulic oil tank 14 is suctioned into the hydraulic pump 13 when the hydraulic pump 13 is rotated by the engine 11. High-pressurized oil is delivered into a pump line 15 from the discharge side of the hydraulic pump 13. The pump line 15 establishes connection between the hydraulic pump 13 and a control valve device 19 to be described later. On the other hand, the returned oil from the hoist cylinder 12 is discharged through a low-pressure return line 16 to the hydraulic oil tank 14. The return line 16 returns the hydraulic oil which is delivered from the hydraulic pump 13 and passes through the control valve device 19 back to the hydraulic oil tank 14.

Indicated at 17 and 18 are actuator lines which selectively connect the outflow side of the control valve device 19 to the bottom-side oil chamber 12G and the rod-side oil chambers 12E and 12F in the hoist cylinder 12, respectively. The actuator lines 17 and 18 are connected through the inflow side of the control valve device 19 to be described later respectively to the hydraulic sources (the hydraulic pump 13 and the hydraulic oil tank 14). That is, the actuator lines 17 and 18 establish connection between the outflow side of the control valve device 19 and the hoist cylinder 12 through actuator connecting oil passages 26A, 26B, 27A and 27B to be described later. Specifically, the bottom-side actuator line 17 as one actuator line is connected to the bottom-side oil chamber 12G in the hoist cylinder 12 from the actuator connecting oil passages 26A and 27A through the inside of the rod 12C in the hoist cylinder 12. The rod-side actuator line 18 as the other actuator line is connected to the rod-side oil chambers 12E and 12F in the hoist cylinder 12 from the actuator connecting oil passages 26B and 27B through the inside of the rod 12C in the hoist cylinder 12.

Thereby, the pressurized oil from the hydraulic pump 13 is supplied through the actuator lines 17 and 18 to the bottom-side oil chamber 12G or the rod-side oil chambers 12E and 12F in the hoist cylinder 12. The pressurized oil in the bottom-side oil chamber 12G or the rod-side oil chambers 12E and 12F is discharged to the hydraulic oil tank 14 through any of the actuator lines 17 and 18.

Designated at 19 is the control valve device which is provided between the hydraulic sources (the hydraulic pump 13 and the hydraulic oil tank 14) and the hoist cylinder 12. The control valve device 19 controls pressurized oil of supply and discharge to and from the hoist cylinder 12. The control valve device 19 comprises, for example, a high-pressure side oil passage 20, low-pressure side oil passages 21 and 22, a center bypass oil passage 23, a first directional control valve 24, a second directional control valve 25, the actuator connecting oil passages 26A, 26B, 27A and 27B, check valves 28A, 28B, 30A and 30B, and relief valves 29A and 29B. The first directional control valve 24 and the second directional control valve 25 have a parallel connection with each other through the high-pressure side oil passage 20, the low-pressure side oil passages 21 and 22, and the center bypass oil passage 23. It should be noted that the control valve device 19 is configured, for example, as one valve block or by a combination of a plurality of valve blocks.

The high-pressure side oil passage 20 has one end which is connected through the pump line 15 to the delivery side of the hydraulic pump 13 and the other end which is connected to the second directional control valve 25. A branch line 32 to be described later is connected to the midway section of the high-pressure side oil passage 20. The low pressure-side oil passage 21 is arranged in the return side of the first directional control valve 24 and connects the actuator connecting oil passages 26A and 26B to be described later to the hydraulic oil tank 14 through the return line 16. The low pressure-side oil passage 22 is arranged in the return side of the second directional control valve 25 and connects the actuator connecting oil passages 27A and 27B to be described later to the hydraulic oil tank 14 through the return line 16. The center bypass oil passage 23 connects the pump line 15 and the return line 16 when the first and second directional control valves 24 and 25 are both in a neutral position (N), and when the first directional control valve 24 is in a floating position (F) and the second directional control valve 25 is in a neutral position (N).

In this case, as shown in FIG. 3, when the first and second directional control valves 24 and 25 are both in the neutral position (N), the hydraulic pump 13 is in an unloading state and a delivery pressure of the hydraulic pump 13 (pressure inside the pump line 15) is kept in a low pressure state close to a tank pressure. On the other hand, as shown in FIG. 4, when the first directional control valve 24 is in the floating position (F) and the second directional control valve 25 is in the neutral position (N), a pressure (back pressure) in the pump line 15 is kept by a throttle 24C to be described later to correspond to a flow rate of hydraulic oil flowing in the throttle 24C and a flow passage area of the throttle 24C. In consequence, when the control valve device 19 is in the floating position (F), as described later, the rod-side oil chambers 12E and 12F in the hoist cylinder 12 are pressurized by the pressure kept by the throttle 24C.

A pair of the actuator connecting oil passages 26A and 26B are provided in the outflow side of the first directional control valve 24. The actuator connecting oil passages 26A and 26B are connected through the actuator lines 17 and 18 respectively to the bottom-side oil chamber 12G, and the rod-side oil chambers 12E and 12F in the hoist cylinder 12 and connected respectively to the return line 16 (hydraulic oil tank 14). A pair of the actuator connecting oil passages 27A and 27B are provided in the outflow side of the second directional control valve 25. The actuator connecting oil passages 27A and 27B are connected through the actuator lines 17 and 18 respectively to the bottom-side oil chamber 12G, and the rod-side oil chambers 12E and 12F in the hoist cylinder 12, and connected respectively to the return line 16 (hydraulic oil tank 14). It should be noted that the respective actuator connecting oil passages 26A, 26B, 27A and 27B are formed as oil passages in the valve block configuring the control valve device 19.

Each of the first and second directional control valves 24 and 25 is configured of a hydraulic pilot type directional control valve having six ports and three positions, for example. The first directional control valve 24 includes a pair of hydraulic pilot portions 24A and 24B. The first directional control valve 24 is switched from the neutral position (N) to a raising position (R) when a pilot pressure is supplied to the hydraulic pilot portion 24A from a raising operation solenoid valve 35 to be described later, and is switched from the neutral position (N) to the floating position (F) when a pilot pressure is supplied to the hydraulic pilot portion 24B from a floating operation solenoid valve 37 to be described later.

The second directional control valve 25 includes a pair of hydraulic pilot portions 25A and 25B. The second directional control valve 25 is switched from the neutral position (N) to the raising position (R) when a pilot pressure is supplied to the hydraulic pilot portion 25A from the raising operation solenoid valve 35, and is switched from the neutral position (N) to a lowering position (L) when a pilot pressure is supplied to the hydraulic pilot portion 25B from a lowering operation solenoid valve 36 to be described later.

That is, as shown in FIG. 3 and FIG. 4, the control valve device 19 has a plurality of switching positions composed of the neutral position (N), the raising position (R), the lowering position (L), and the floating position (F), and is switched to any position of the respective switching positions. Here, description will be made of a case where the control valve device 19 is in the neutral position (N). In this case, as shown in FIG. 3, by disposing the first and second directional control valves 24 and 25 both in the neutral position (N), the control valve device 19 becomes in a holding position to stop movement of the hoist cylinder 12 for holding the vessel 3. In the neutral position (N) as the holding position, supply and discharge of pressurized oil to and from the hoist cylinder 12 through the actuator connecting oil passages 26A and 26B, and the actuator connecting oil passages 27A and 27B are stopped.

Description will be made of a case where the control valve device 19 is in the raising position. In this case, a pilot pressure is supplied to the hydraulic pilot portions 24A and 25A in the first and second directional control valves 24 and 25 from the raising operation solenoid valve 35 to be described later, and thereby the first and second directional control valves 24 and 25 both are switched from the neutral position (N) to the raising position (R). When the first and second directional control valves 24 and 25 are switched to the raising position (R), pressurized oil from the hydraulic pump 13 is supplied into the bottom-side oil chamber 12G in the hoist cylinder 12 through the pump line 15, the high-pressure side oil passage 20, the first and second directional control valves 24 and 25, the actuator connecting oil passages 26A and 27A and the bottom-side actuator line 17. At this time, when the first directional control valve 24 is switched to the raising position (R), the hydraulic oil in the rod-side oil chambers 12E and 12F is returned to the hydraulic oil tank 14 through the rod-side actuator line 18, the actuator connecting oil passage 26B, the directional control valve 24, the low pressure-side oil passage 21 and the return line 16.

As a result, the inner tube portion 12B and/or the rod 12C in the hoist cylinder 12 expands by pressurized oil in the bottom-side oil chamber 12G to rotate the vessel 3 to a dumping position shown in FIG. 2. That is, at this time, the first and second directional control valves 24 and 25 in the control valve device 19 both are arranged in the raising position (R), and the hoist cylinder 12 expands by a hydraulic force to tilt the vessel 3 upward.

On the other hand, description will be made of a case where the control valve device 19 becomes in the lowering position. In this case, a pilot pressure is supplied to the hydraulic pilot portion 25B in the second directional control valve 25 from the lowering operation solenoid valve 36 to be described later, and thereby the second directional control valve 25 is switched from the neutral position (N) to the lowering position (L). The first directional control valve 24 is arranged in the neutral position (N). When the second directional control valve 25 is switched to the lowering position (L), pressurized oil from the hydraulic pump 13 is supplied to the rod-side oil chambers 12E and 12F in the hoist cylinder 12 through the pump line 15, the high-pressure side oil passage 20, the second directional control valve 25, the actuator connecting oil passage 27B, and the rod-side actuator line 18. The hydraulic oil in the bottom-side oil chamber 12G is returned to the hydraulic oil tank 14 through the bottom-side actuator line 17, the actuator connecting oil passage 27A, the second directional control valve 25, the low pressure-side oil passage 22 and the return line 16.

As a result, the inner tube portion 12B and/or the rod 12C in the hoist cylinder 12 contracts by the pressurized oil in the rod-side oil chambers 12E and 12F to downward rotate the vessel 3 to a traveling position shown in FIG. 1. That is, at this time, the second directional control valve 25 in the control valve device 19 is arranged in the lowering position (L), and the hoist cylinder 12 contracts by a hydraulic force to lower the vessel 3 to a position of being seated on the vehicle body 2.

Next, description will be made of a case where the control valve device 19 becomes in the floating position. In this case, as shown in FIG. 4 a pilot pressure is supplied to the hydraulic pilot portion 24B in the first directional control valve 24 from the floating operation solenoid valve 37 to be described later, and thereby the first directional control valve 24 is switched from the neutral position (N) to the floating position (F). The second directional control valve 25 is arranged in the neutral position (N). When the first directional control valve 24 is switched to the floating position (F), the actuator connecting oil passage 26A is connected to the low pressure-side oil passage 21 and the return line 16 through the directional control valve 24. The actuator connecting oil passage 26B is connected to the side of the return line 16 through the check valve 28B to be described later, and also to the pump line 15 through the directional control valve 24. Further, the other actuator connecting oil passage 27B is connected to the low pressure-side oil passage 22 and the return line 16 through the check valve 30B to be described later.

As a result, the hoist cylinder 12 contracts by the load (self-weight) from the vessel 3, and the hydraulic oil in the bottom-side oil chamber 12G is discharged to the hydraulic oil tank 14 through the bottom-side actuator line 17, the actuator connecting oil passage 26A, the directional control valve 24, the low pressure-side oil passage 21 and the return line 16. On the other hand, the hydraulic oil in the hydraulic oil tank 14 is resupplied to the rod-side oil chambers 12E and 12F through the actuator connecting oil passages 26B and 27B and the rod-side actuator line 18 from the check valves 28B and 30B to be described later. That is, at this time the directional control valve 24 in the control valve device 19 is arranged in the floating position (F) of allowing the self-weight fall of the vessel 3.

In this case, the rod-side oil chambers 12E and 12F are connected also to the pump line 15 through the rod-side actuator line 18, the actuator connecting oil passage 26B and the directional control valve 24. That is, as shown in FIG. 4 and FIG. 5, in a case of the present embodiment, when the first directional control valve 24 is in the floating position (F), the pump line 15 is connected to the return line 16 through the first directional control valve 24 and the center bypass oil passage 23, and is connected also to the rod-side actuator line 18 through the first directional control valve 24 and the actuator connecting oil passage 26B.

Here, a throttle 24C as a flow rate limiting section that limits a flow rate of hydraulic oil returning to the hydraulic oil tank 14 through the first directional control valve 24 from the hydraulic pump 13 is provided in the floating position (F) of the first directional control valve 24. That is, the throttle 24C which limits the flow rate of the hydraulic oil flowing in the return line 16 through the directional control valve 24 and the center bypass oil passage 23 from the pump line 15 is provided in the floating position (F) of the directional control valve 24. The throttle 24C reduces an area (flow passage area) of a flow passage (a line and a passage) of the hydraulic oil returning to the hydraulic oil tank 14. For example, a notch may be formed as the throttle 24C in a land portion of a spool in the directional control valve 24, wherein it is possible to limit the flow rate of the hydraulic oil flowing from the pump line 15 to the return line 16 through the notch.

When the first directional control valve 24 in the control valve device 19 is in the floating position (F), the upstream side of the rod-side actuator line 18 as a line communicated with the rod-side oil chambers 12E and 12F in the hoist cylinder 12 is connected to the pump line 15 positioned between the hydraulic pump 13 and the throttle 24C. That is, when the first directional control valve 24 is in the floating position (F), the upstream side of the throttle 24C is connected to the pump line 15 and the downstream side of the throttle 24C is connected to the return line 16 through the center bypass oil passage 23. In addition, the rod-side actuator line 18 is connected to the pump line 15 through the actuator connecting oil passage 26B and the directional control valve 24.

Therefore, the hydraulic oil which is delivered from the hydraulic pump 13 and flows in the return line 16 through the pump line 15, the first directional control valve 24 and the center bypass oil passage 23 is limited in flow rate by the throttle 24C (a pressure loss is generated). Thereby, a high pressure (back pressure) corresponding to a flow rate of the hydraulic oil flowing through the throttle 24C and a flow passage area (the degree of the flow rate limit) of the throttle 24C is generated in the pump line 15 upstream of the throttle 24C.

In this case, since the rod-side actuator line 18 is connected to the pump line 15 through the actuator connecting oil passage 26B and the first directional control valve 24, the rod-side oil chambers 12E and 12F in the hoist cylinder 12 are subjected to a pressure in the side of the pump line 15 which has become a high pressure by the throttle 24C. In consequence, a thrust force (contraction force) in a direction of contracting the rod 12C (and the inner tube portion 12B) is generated in the hoist cylinder 12, making it possible for the hoist cylinder 12 to push down the vessel 3 on the vehicle body 2.

That is, as shown in an arrow F in FIG. 1, a thrust force F (contraction force F) as a downward force is applied to the vessel 3 from the hoist cylinder 12. As a result, when the vehicle travels in a state where the control valve device 19 is in the floating position (F), even if a force in a direction of floating the vessel 3 from the vehicle body 2 is applied to the vessel 3 due to passage of the vehicle on the bumpy road surface, the thrust force F of the hoist cylinder 12 forcibly seats the vessel 3 on the vehicle body 2, thus making it possible to restrict the floating (flopping) of the vessel 3.

It should be noted that the flow passage area of the throttle 24C is set as needed such that the thrust force F necessary for restricting the floating of the vessel 3 can be generated in the hoist cylinder 12 within a range where an excessive load is not applied to the engine 11 which drives the hydraulic pump 13. That is, as the flow passage area of the throttle 24C is made smaller, a pressure upstream of the throttle 24C is the higher, thus making it possible to increase the thrust force F (force F pushing the vessel 3 to the side of the vehicle body 2) of the hoist cylinder 12. However, the load of the hydraulic pump 13 is increased by the extent of decreasing the flow passage area, and an efficiency of the engine 11 possibly degrades (energy losses increase). Therefore, the flow passage area of the throttle 24C is set as needed such that a pressure which can restrict the floating of the vessel 3 can be increased (generated) upstream of the throttle 24C by a delivery amount of the hydraulic pump 13 corresponding to an engine rotational speed at traveling in consideration of the efficiency of the engine 11.

In the floating position (F) of the first directional control valve 24, there are provided the throttle 24C and besides, a different throttle 24D which limits a flow rate of hydraulic oil flowing in the return line 16 from the bottom-side oil chamber 12G through the bottom-side actuator line 17, the actuator connecting oil passage 26A, the first directional control valve 24 and the low pressure-side oil passage 21. The different throttle 24D limits the flow rate of the hydraulic oil flowing from the bottom-side oil chamber 12G to the hydraulic oil tank 14 to restrict a descending speed (downward rotating speed) of the vessel 3 from being excessively fast.

The make-up check valves 28A and 28B are disposed in the control valve device 19 in the side of the first directional control valve 24. The check valves 28A and 28B are provided midway through the actuator connecting oil passages 26A and 26B bypassing the outflow side of the first directional control valve 24. One check valve 28A allows the hydraulic oil in the hydraulic oil tank 14 to flow toward the bottom-side oil chamber 12G in the hoist cylinder 12 through the actuator connecting oil passage 26A and the actuator line 17, and prevents the reverse flow of the hydraulic oil in the hydraulic oil tank 14. This configuration prevents the bottom-side oil chamber 12G in the hoist cylinder 12 from being a negative pressure by the hydraulic oil resupplied through the check valve 28A during the expansion process of the hoist cylinder 12.

On the other hand, the other check valve 28B allows the hydraulic oil in the hydraulic oil tank 14 to flow toward the rod-side oil chambers 12E and 12F in the hoist cylinder 12 from the hydraulic oil tank 14 through the actuator connecting oil passage 26B and the actuator line 18, and prevents the reverse flow of the hydraulic oil in the hydraulic oil tank 14. This configuration prevents the rod-side oil chambers 12E and 12F in the hoist cylinder 12 from being a negative pressure by the hydraulic oil resupplied through the check valve 28B during the contraction process of the hoist cylinder 12.

Relief valves 29A and 29B for excessive load prevention are provided in the control valve device 19. The relief valves 29A and 29B are provided in parallel to the check valves 28A and 28B midway through the actuator connecting oil passages 26A and 26B bypassing the outflow side of the first directional control valve 24. The relief valve 29A as one of the relief valves 29A and 29B opens for relieving an excessive pressure in the side of the bottom-side oil chamber 12G to the hydraulic oil tank 14 when an excessive load in the contraction direction is applied to the hoist cylinder 12. The other relief valve 29B opens for relieving an excessive pressure in the side of the rod-side oil chambers 12E and 12F when an excessive load in the expansion direction is applied to the hoist cylinder 12.

The make-up check valves 30A and 30B are disposed in the control valve device 19 in the side of the second directional control valve 25. The check valves 30A and 30B are provided midway through the actuator connecting oil passages 27A and 27B bypassing the outflow side of the second directional control valve 25. One check valve 30A allows the hydraulic oil in the hydraulic oil tank 14 to flow toward the bottom-side oil chamber 12G in the hoist cylinder 12 from the low pressure-side oil passage 22 (hydraulic oil tank 14) through the actuator connecting oil passage 27A and the actuator line 17, and prevents the reverse flow of the hydraulic oil in the hydraulic oil tank 14. Thereby, the check valve 30A resupplies the hydraulic oil to the bottom-side oil chamber 12G in the hoist cylinder 12 to prevent the bottom-side oil chamber 12G from being a negative pressure during the expansion process of the hoist cylinder 12.

On the other hand, the other check valve 30B, for example, allows the hydraulic oil in the hydraulic oil tank 14 to flow toward the rod-side oil chambers 12E and 12F in the hoist cylinder 12 from the low pressure side oil passage 22 (the hydraulic oil tank 14) through the actuator connecting oil passage 27B and the actuator line 18, and prevents the reverse flow of the hydraulic oil in the hydraulic oil tank 14. Thereby, the check valve 30B resupplies the hydraulic oil to the rod-side oil chambers 12E and 12F in the hoist cylinder 12 to prevent the rod-side oil chambers 12E and 12F from being a negative pressure during the contraction process of the hoist cylinder 12.

The main relief valve 31 is disposed between the pump line 15 (the high-pressure side oil passage 20) and the hydraulic oil tank 14 (the low pressure-side oil passage 21 and the return line 16). The relief valve 31 determines a maximum delivery pressure of the hydraulic pump 13 and restricts a pressure in the pump line 15 to the maximum delivery pressure or less. That is, the relief valve 31 opens when an excessive pressure exceeding the maximum delivery pressure is generated in the pump line 15, and relieves the excessive pressure at this time to the side of the hydraulic oil tank 14.

Next, an explanation will be made of solenoid valves 35, 36 and 37, an operating lever device 38, a controller 40 and the like, which control the control valve device 19.

Indicated at 32 is a branch line a base side of which is disposed to be branched from the high-pressure side oil passage 20, and the branch line 32 is connected to a pilot pressure supply line 34 through a pressure reducing valve 33. The pressure reducing valve 33 is switched to a valve closing position (a) and a valve opening position (b) to reduce a pressure of pressurized oil in the branch line 32, which is supplied to the pilot pressure supply line 34. Therefore, the pressure in the pilot pressure supply line 34 is kept in a setting pressure (that is, a pressure lower than that in the branch line 32) in advance determined by the pressure reducing valve 33. It should be noted that the branch line 32 may be branched, not from the high-pressure side oil passage 20, but midway through the pump line 15.

The solenoid valves 35, 36 and 37 supply a pilot pressure to the hydraulic pilot portions 24A, 24B, 25A and 25B in the first and second directional control valves 24 and 25 in the control valve device 19, respectively. The solenoid valves 35 to 37 are provided between the controller 40 to be described later and the control valve device 19. The solenoid valves 35 to 37 opens and closes individually in response to an operation of the operating lever device 38 to be described later, and supply a pilot pressure for switching control to the control valve device 19 at valve opening.

The raising operation solenoid valve 35 thereof is switched from a valve closing position (c) to a valve opening position (d) in response to an excitation signal from the controller 40, and supplies a raising operation pilot pressure from the pilot pressure supply line 34 toward the hydraulic pilot portions 24A and 25A in the first and second directional control valves 24 and 25 in the valve opening position (d). In consequence, the directional control valves 24 and 25 in the control valve device 19 are switched from the neutral position (N) to the raising position (R) shown in FIG. 3.

The lowering operation solenoid valve 36 is switched from the valve closing position (c) to the valve opening position (d) in response to an excitation signal from the controller 40, and supplies a lowering operation pilot pressure from the pilot pressure supply line 34 toward the hydraulic pilot portion 25B in the second directional control valve 25 in the valve opening position (d). In consequence, the second directional control valve 25 in the control valve device 19 is switched from the neutral position (N) to the lowering position (L) shown in FIG. 3. Since the solenoid valves 35 and 37 are demagnetized to be in the valve closing position (c) at this time, the first directional control valve 24 is arranged in the neutral position (N).

On the other hand, the floating operation solenoid valve 37 is switched from the valve closing position (c) to the valve opening position (d) in response to an excitation signal from the controller 40, and supplies a floating operation pilot pressure from the pilot pressure supply line 34 toward the hydraulic pilot portion 24B in the first directional control valve 24 in the valve opening position (d). In consequence, the first directional control valve 24 in the control valve device 19 is switched from the neutral position (N) shown in FIG. 3 to the floating position (F) shown in FIG. 4 and FIG. 5. Since the solenoid valves 35 and 36 are demagnetized to be in the valve closing position (c) at this time, the second directional control valve 25 is arranged in the neutral position (N).

Indicated at 38 is the operating device for performing a switching operation of the control valve device 19. The operating lever device 38 is configured by an electric lever device, for example, and is disposed in a position close to the operator's seat in the cab 6. The operating lever device 38 has an operating lever 38A that is manually operated to be tilted by an operator in the cab 6. The operating lever 38A is tilted to any of the neutral position (N), the raising position (R), the lowering position (L) and the floating position (F) corresponding to the respective switching positions of the control valve device 19, that is, the neutral position (N), the raising position (R), the lowering position (L) and the floating position (F).

A lever sensor 39 is attached to the operating lever device 38. The lever sensor 39 detects an operating position (lever position) of the operating lever 38A by the operator and outputs the detection signal to the controller 40 to be described later. Specifically, the lever sensor 39 detects in which position among the neutral position (N), the raising position (R), the lowering position (L) and the floating position (F) the operating lever 38A in the operating lever device 38 is.

The controller 40 is composed of a microcomputer, and the controller 40 has an input side connected to the lever sensor 39 and the like, and an output side connected to the solenoid valves 35 to 37 and the like. The controller 40 determines an operating position of the operating lever 38A based upon a detection signal from the lever sensor 39, and outputs an excitation signal to the solenoid valves 35 to 37 to associate the operating position of the operating lever 38A with the switching position of the control valve device 19.

The dump truck 1 according to the present embodiment has the aforementioned configuration, and next, an operation thereof will be explained.

First, in a stone-crushing site such as a mine, for example, a large-sized hydraulic excavator (not shown) is used to load earth and sand 4 as objects to be transported on the vessel 3. At this time, the vessel 3 is placed in the traveling position shown in FIG. 1, and the dump truck 1 transports the earth and sand 4 to a cargo unloading site in a state where a large number of the earth and sand 4 is loaded on the vessel 3.

In the cargo unloading site, the cargo unloading work starts. Here, when an operator in the cab 6 manually tilts the operating lever 38A in the operating lever device 38 from the neutral position (N) to the raising position (R), the controller 40 outputs an excitation signal to the raising operation solenoid valve 35. Thereby, the raising operation solenoid valve 35 is switched from the valve closing position (c) to the valve opening position (d), and a raising operation pilot pressure is supplied to the hydraulic pilot portions 24A and 25A in the directional control valves 24 and 25 in the control valve device 19 from the pilot pressure supply line 34.

Therefore, the control valve device 19 is switched from the neutral position (N) to the raising position (R). As a result, the pressurized oil from the hydraulic pump 13 is supplied through the pump line 15, the high-pressure side oil passage 20, the first and second directional control valves 24 and 25, the actuator connecting oil passages 26A and 27A and the bottom-side actuator line 17 into the bottom-side oil chamber 12G in the hoist cylinder 12. The hydraulic oil in the rod-side oil chambers 12E and 12F is returned through the rod-side actuator line 18, the actuator connecting oil passage 26B, the first directional control valve 24, the low pressure-side oil passage 21 and the return line 16 back to the hydraulic oil tank 14.

As a result, the inner tube portion 12B and/or the rod 12C in the hoist cylinder 12 expands in a direction of an arrow Z in FIG. 2 by the pressurized oil in the bottom-side oil chamber 12G to rotate the vessel 3 to the dumping position shown in FIG. 2 in such a manner as to tilt the vessel 3 diagonally backward. At this time, the dump truck 1 rotates the vessel 3 to a tilting posture as shown in FIG. 2 on a basis of the connecting pin 5. Therefore, the earth and sand 4 in the vessel 3 can be dumped to the cargo unloading site in a direction of an arrow Y in such a manner as to slide downward.

At this time, when an operator releases its hand from the operating lever 38A, the operating lever 38A automatically returns back to the neutral position (N) by a returning spring (not shown). Therefore, a signal which is output to the raising operation solenoid valve 35 from the controller 40 is in a demagnetizing state (OFF), and the raising operation solenoid valve 35 returns back to the valve closing position (c) shown in FIG. 3. Therefore, the directional control valves 24 and 25 in the control valve device 19 are automatically returned to the neutral position (N) to stop supply and discharge of the pressurized oil to and from the bottom-side oil chamber 12G and the rod-side oil chambers 12E and 12F in the hoist cylinder 12. Accordingly, the hoist cylinder 12 can maintain the inner tube portion 12B and the rod 12C in the expanding state and temporarily stop the vessel 3 in a state of being maintained in the tilting posture shown in FIG. 2.

Next, when the dumping operation of the earth and sand 4 is completed, an operator manually tilts the operating lever 38A from the neutral position (N) to the floating position (F), an excitation signal is output to the floating operation solenoid valve 37 from the controller 40. Therefore, as shown in FIG. 4, the floating operation solenoid valve 37 is switched from the valve closing position (c) to the valve opening position (d), and a floating operation pilot pressure is supplied to the hydraulic pilot portion 24B in the first directional control valve 24 from the pilot pressure supply line 34.

Therefore, the first directional control valve 24 in the control valve device 19 is switched from the neutral position (N) to the floating position (F). Since the solenoid valves 35 and 36 are demagnetized to be in the valve closing position (c) at this time, the second directional control valve 25 is arranged in the neutral position (N). In consequence, the actuator connecting oil passage 26A is connected to the low pressure-side oil passage 21 and the return line 16 through the first directional control valve 24. The actuator connecting oil passage 26B is connected to the side of the return line 16 through the check valve 28B, and is also connected to the side of the pump line 15 through the first directional control valve 24. Further, the other actuator connecting oil passage 27B is connected to the low pressure-side oil passage 22 and the return line 16 through the check valve 30B.

In consequence, the hoist cylinder 12 is operated to contract according to a load (self-weight) from the vessel 3, and the hydraulic oil in the bottom-side oil chamber 12G is discharged toward the hydraulic oil tank 14 and also the hydraulic oil in the hydraulic oil tank 14 is supplied into the rod-side oil chambers 12E and 12F through the check valve 28B and/or the check valve 30B. In this case, the hydraulic oil is supplied (resupplied) into the rod-side oil chambers 12E and 12F through the first directional control valve 24 also from the side of the pump line 15. In this case, however, the cargo unloading work is completed, but the dump truck 1 is still in a stopping state. Therefore, the engine rotating speed is low. Accordingly, the pressure in the side of the pump line 15 kept by the throttle 24C is low, and the amount of the hydraulic oil supplied into the rod-side oil chambers 12E and 12F from the side of the pump line 15 also corresponds to the pressure. In any way, the hoist cylinder 12 allows fall of the vessel 3 by the self-weight, thereby making it possible to lower down the vessel 3 to the traveling position shown in FIG. 1 and seat the vessel 3 on the vehicle body 2.

On the other hand, when the dump truck 1 is in a tilting state on the bumpy work site or on the sloping ground in the work site, even if the control valve device 19 is switched to the floating position (F), the vessel 3 does not possibly fall down by the self-weight. In such a case, however, an operator performs a tilting operation of the operating lever 38A until the lowering position (L), and thereby the controller 40 outputs an excitation signal to the lowering operation solenoid valve 36. Therefore, the lowering operation solenoid valve 36 is switched from the valve closing position (c) to the valve opening position (d), and a lowering operation pilot pressure is supplied from the pilot pressure supply line 34 to the hydraulic pilot portion 25B in the second directional control valve 25.

Therefore, the second directional control valve 25 in the control valve device 19 is switched from the neutral position (N) to the lowering position (L). At this time, the solenoid valves 35 and 37 are demagnetized to be in the valve closing position (c). Therefore, the first directional control valve 24 is arranged to be in the neutral position (N). In consequence, the pressurized oil from the hydraulic pump 13 is supplied into the rod-side oil chambers 12E and 12F in the hoist cylinder 12 through the pump line 15, the high-pressure side oil passage 20, the second directional control valve 25, the actuator connecting oil passage 27B and the rod-side actuator line 18. The hydraulic oil in the bottom-side oil chamber 12G is returned back to the hydraulic oil tank 14 through the bottom-side actuator line 17, the actuator connecting oil passage 27A, the second directional control valve 25, the low pressure-side oil passage 22 and the hydraulic oil return line 16. Thereby, the hoist cylinder 12 is operated in such a manner that the inner tube portion 12B and/or the rod 12C contracts into the outer tube portion 12A by the pressurized oil supplied into the rod-side oil chambers 12E and 12F, making it possible to rotate the vessel 3 downward to the traveling position as shown in FIG. 1 by the hydraulic force of the hoist cylinder 12 to forcibly seat the vessel 3 on the vehicle body 2.

However, when the control valve device 19 is switched to the lowering position (L), the hoist cylinder 12 is operated to contract with the hydraulic force, and therefore, there is a possibility of applying an extra load to the vessel 3 and the vehicle body 2. When the control valve device 19 is left in a state switched to the lowering position (L) thereafter, the vessel 3 continues to be strongly pressed on the vehicle body 2, and the hydraulic force from the hoist cylinder 12 acts on the abutment surface between the vessel 3 and the vehicle body 2 as an extra load. Therefore, the operator in the dump truck 1 causes the operating lever 38A to be self-retained to the floating position (F) at the traveling of the vehicle. As a result, the control valve device 19 is switched to the floating position (F) and the vessel 3 continues to be seated on the vehicle body 2 by the self-weight and the hoist cylinder 12 also can be maintained in the contraction state using the self-weight of the side of the vessel 3.

Incidentally, when the vehicle travels in a state where the control valve device 19 is in the floating position (F), in a case where the vessel 3 is in a vacant state of the object to be transported, the vessel 3 floats up from the vehicle body 2 following vibrations generated due to knocking-up from the road surface, and at the time the vessel 3 is to be seated on the vehicle body 2, there is a possibility that the vessel 3 collides with the vehicle body 2. Therefore, there is a possibility that uncomfortable feelings are given to an operator in the cab 6 or repeated collisions of the vessel 3 with the vehicle body 2 cause reduction in durability and lifetime.

Therefore, according to the present embodiment, in the floating position (F) of the first directional control valve 24, there is provided the throttle 24C that limits a flow rate of hydraulic oil returning to the hydraulic oil tank 14 through the first directional control valve 24 and the center bypass oil passage 23 from the hydraulic pump 13. Therefore, when the first directional control valve 24 is in the floating position (F), the hydraulic oil which is delivered from the hydraulic pump 13 and flows in the return line 16 through the pump line 15 and the first directional control valve 24 is limited in flow rate by the throttle 24C. Thereby, a high pressure (back pressure) corresponding to a flow rate of the hydraulic oil flowing through the throttle 24C and a flow passage area of the throttle 24C is kept in the pump line 15 upstream of the throttle 24C.

In this case, since the rod-side actuator line 18 is connected to the pump line 15 through the first directional control valve 24, the rod-side oil chambers 12E and 12F in the hoist cylinder 12 are pressurized by the pressure kept by the throttle 24C. Here, the flow rate of the hydraulic oil flowing through the throttle 24C, that is, the delivery rate of the hydraulic pump 13 corresponds to an engine rotating speed of the dump truck 1 at traveling. For example, as the engine rotating speed increases, the pressure in the side of the pump line 15 kept by the throttle 24C becomes the higher. As a result, the pressure to be supplied from the pump line 15 into the rod-side oil chambers 12E and 12F through the actuator connecting oil passage 26B and the rod-side actuator line 18 is also increased.

In consequence, a thrust force F (contraction force F) in a direction of contracting the rod 12C (and the inner tube portion 12B) is generated in the hoist cylinder 12 by the high pressure kept upstream of the throttle 24C (the pump line 15) by the throttle 24C, making it possible for the hoist cylinder 12 to press the vessel 3 on the vehicle body 2. As a result, when the vehicle travels in a state where the control valve device 19 is in the floating position (F), even if a force in a direction of floating the vessel 3 from the vehicle body 2 is applied to the vessel 3 following passage of the vehicle on the bumpy road surface, the thrust force F of the hoist cylinder 12 can seat the vessel 3 on the vehicle body 2, thus restricting the floating-up of the vessel 3.

At this time, the thrust force F of the hoist cylinder 12 can be all the time generated by the throttle 24C. Therefore, the vessel 3 can be stably seated on the vehicle body 2. In addition, since a sensor for detecting the movement of the vessel 3 is not necessary, an increase in cost can be restricted.

According to the present embodiment, the throttle 24C limits the flow rate of the hydraulic oil which returns to the hydraulic oil tank 14 through the first directional control valve 24 and the center bypass oil passage 23 from the hydraulic pump 13. Therefore, a desired pressure (back pressure) can be kept upstream of this throttle 24C by setting the flow passage area of this throttle 24C to an appropriate magnitude. That is, by setting the flow passage area of this throttle 24C to the appropriate magnitude, the thrust force F necessary for restricting the floating of the vessel 3 can be generated in the hoist cylinder 12 while restricting the load of the hydraulic pump 13.

Further, according to the present embodiment, the control valve device 19 is configured using the first and second directional control valves 24 and 25 connected in parallel between the hydraulic pump 13 and the hoist cylinder 12. In this case, when the first directional control valve 24 is in the floating position (F), the vessel 3 can be pressed to the vehicle body 2 by the hoist cylinder 12 to stably seat the vessel 3 on the vehicle body 2.

It should be noted that the aforementioned embodiment is explained by taking a case where the two-step hoist cylinder 12 is used, as an example. However, the present invention is not limited to that, and a multi-step hoist cylinder (hydraulic cylinder), for example, a three or more-step hoist cylinder or a one-step hoist cylinder (hydraulic cylinder) may be used.

For example, in a case of a one-step hoist cylinder, the hoist cylinder may be configured of a single cylinder (cylindrical portion), a rod and a piston which defines an inside of the cylinder as a rod-side oil chamber and a bottom-side oil chamber.

Further, in the aforementioned embodiment, an explanation is made by taking a case of using the rear wheel drive type dump truck 1 as the transport vehicle, as an example. However, the present invention is not limited to that, the present invention may be applied to, for example, a front wheel drive type dump truck or a four-wheel drive type dump truck driving front and rear wheels both, and may be applied to a transport vehicle equipped with traveling wheels other than the dump truck. Further, the present invention may be applied to a crawler type transport vehicle.

DESCRIPTION OF REFERENCE NUMERALS

1: Dump truck (Transport vehicle)
2: Vehicle body
3: Vessel
4: Earth and sand (Burden)
12: Hoist cylinder
12E, 12F: Rod-side oil chamber
13: Hydraulic pump (Hydraulic source)
14: Hydraulic oil tank (Hydraulic source)
15: Pump line
16: Return line
17: Bottom-side actuator line
18: Rod-side actuator line
19: Control valve device
24: First directional control valve
24C: Throttle (Flow rate limiting section)
25: Second directional control valve
26A, 26B, 27A, 27B: Actuator connecting oil passage
28A, 28B, 30A, 30B: Check valve

The invention claimed is:
1. A transport vehicle comprising:
an automotive vehicle body;
a vessel which tilts up and down provided on said vehicle body and on which objects to be transported are loaded;
a hoist cylinder which is provided between said vessel and said vehicle body and tilts said vessel upward or downward with expansion or contraction of a rod;
a hydraulic source comprising a hydraulic oil tank for reserving hydraulic oil therein and a hydraulic pump for delivering hydraulic oil under pressure;
a control valve device for controlling supply and discharge of the hydraulic oil to and from said hoist cylinder;
a pump line for establishing connection between said hydraulic pump and said control valve device;
actuator lines for establishing connection between said control valve device and said hoist cylinder; and
a return line for returning the hydraulic oil which is delivered from said hydraulic pump and passes through said control valve device back to said hydraulic oil tank, wherein
said control valve device has a plurality of switching positions composed of a raising position of expanding said hoist cylinder with supply and discharge of the hydraulic oil to under pressure to tilt said vessel upward, a lowering position of contracting said hoist cylinder with supply and discharge of the hydraulic oil to lower down said vessel, a floating position of contracting said hoist cylinder to allow for self-weight fall of said vessel, and a neutral position of stopping movement of said hoist cylinder by stopping supply and discharge of the hydraulic oil to hold said vessel, a flow rate limiting section is provided in said floating position of said control valve device to limit a flow rate of the hydraulic oil flowing in said return line from said hydraulic pump, wherein when said control valve device is in said floating position, an upstream side of said flow rate limiting section is connected to said pump line, a downstream side of said flow rate limiting section is connected to said return line, and a rod-side actuator line communicated with rod-side oil chambers in said hoist cylinder among said actuator lines is connected to said pump line, a pressure generated in said pump line upstream of said flow rate limiting section acts on said rod-said oil chambers through said rod-said actuator line, and a thrust force which restricts floating-up of said vessel that is generated in said hoist cylinder at the time said vehicle body travels.

2. The transport vehicle according to claim 1, wherein said flow rate limiting section comprises a throttle which reduces a flow passage area.

3. The transport vehicle according to claim 1, wherein said control valve device comprises first and second directional control valves connected in parallel between said hydraulic source and said hoist cylinder, wherein said first directional control valve is switchable to any position of said neutral position, said raising position and said floating position, and said second directional control valve is switchable to any position of said neutral position, said raising position and said lowering position.

4. The transport vehicle according to claim 1, wherein actuator connecting oil passages which connect an outflow side of said control valve device to said actuator line and said return line or said hydraulic oil tank are provided, and check valves are provided midway of said actuator connecting oil passages to allow flow of the hydraulic oil only to a side of said hoist cylinder from said return line or said hydraulic oil tank.

* * * * *